May 19, 1959  H. R. DALTON  2,887,632
ZINC OXIDE SEMICONDUCTORS AND METHODS OF MANUFACTURE
Filed April 16, 1952
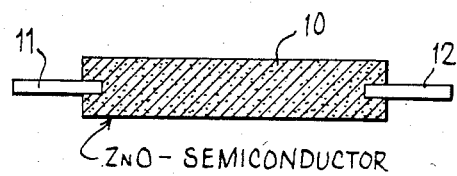
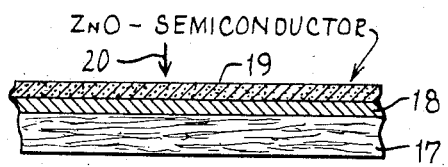
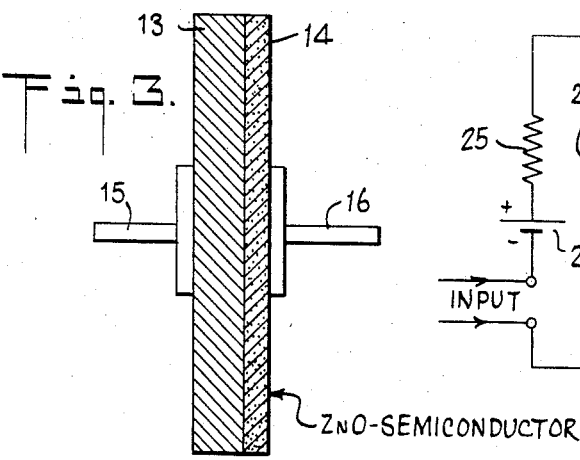
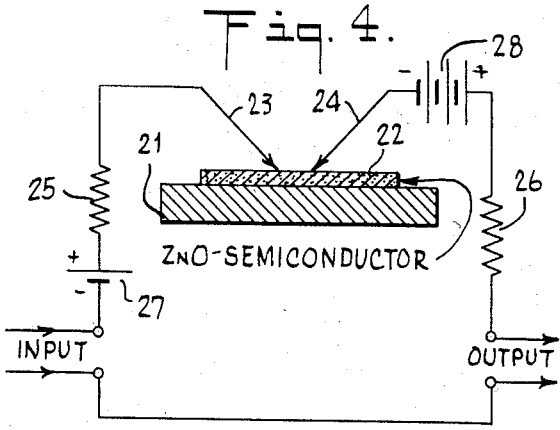
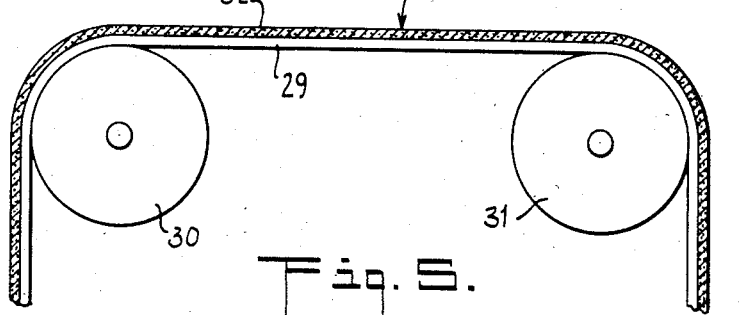
INVENTOR.
HAROLD R. DALTON
BY
ATTORNEY

United States Patent Office 2,887,632
Patented May 19, 1959

2,887,632

ZINC OXIDE SEMICONDUCTORS AND METHODS OF MANUFACTURE

Harold R. Dalton, Jenkintown, Pa., assignor to Timefax Corporation, New York, N.Y., a corporation of New York Application April 16, 1952, Serial No. 282,730

5 Claims. (Cl. 317—238)

This invention relates to new compositions of matter and more particularly it relates to novel resistance materials and methods of manufacture thereof, which materials are constituted mainly of zinc oxide as the semiconductor.

Methods have been previously disclosed of making resistance materials having particularly desirable characteristics from combination of metal oxides in proper relative proportions fired at temperatures ranging from 1000° C. to 1400° C. These materials are ceramic-like or sintered bodies shaped in the form of discs or plates to be used as semiconductors. Their use is well known in the electrical art.

Another group of materials not generally considered as semiconductors because of their very high resistance and utility for other purposes, are the phosphors and fluorescent materials made from metallic oxides. In order to induce good fluorescent properties they require a great deal of care in their manufacture to keep all ingredients of exceptionally high purity. They are also fired to exacting temperature schedules to promote proper crystal growth and luminescent properties, the firing temperatures being in the range of approximately 1000° C. to 1500° C. The use of this group of materials is well known in the television and cathode ray tube arts.

An object of the invention is to produce a material of low specific resistance from zinc oxide and a free metal or combination of metals.

A more specific object of the invention is to lower the specific resistance of zinc oxide and composite materials incorporating such oxide.

While zinc oxide has been used quite generally in the various arts, for example as a pigment for paints and the like, its electrical conductivity has been immaterial.

Another object of the invention is, therefore, to produce a material of low specific resistance notwithstanding, that is in a finely divided form.

Another object is to produce a composite material comprising as a substantial constituent thereof a powdered component such as zinc oxide which in the normal powdered state has relatively high specific resistance, and firing the material at a temperature of approximately 600° C. to 900° C. so that the product has a relatively low specific resistance.

A feature of the invention relates to an improved semiconductor element constituted mainly of modified zinc oxide according to the invention.

Another feature relates to an electrically sensitive recording blank having a surface coating constituted mainly of modified zinc oxide according to the invention.

Another feature relates to an improved contact rectifier employing a plate or plates of modified zinc oxide according to the invention.

Another feature relates to an improved form of "transistor" using a modified zinc oxide base.

Another feature relates to a coating for use in the various arts to effect a discharge of static electricity.

Another feature relates to the novel organization of method steps for producing an improved semiconductor constituted mainly of modified zinc oxide.

In the drawing,

Fig. 1 shows a semiconductor resistance according to the invention.

Fig. 2 is a cross sectional view of an electrosensitive recording blank according to the invention.

Fig. 3 is a sectional view of a contact rectifier according to the invention.

Fig. 4 is a sectional view of a transistor according to the invention.

Fig. 5 is a schematic diagram of a coated static discharge belt or the like according to the invention.

The present invention is based upon the discovery that if certain metals are incorporated in a special way with zinc oxide, as described in detail hereinbelow, the specific resistance of the zinc oxide is greatly lowered permitting it to be used in various fields of application where electric conductivity is a desideratum.

A complete understanding of the invention may be gained from the following detailed description in which the metal zinc and aluminum are used as examples of the metal added to the zinc oxide. The invention is not limited to the use of zinc or aluminum metal as it has been found that most divalent and trivalent metals produce equally satisfactory results. For example, it has been found that the added zinc can be replaced by copper, manganese, nickel, iron, tin, bismuth, silver, lead, calcium, barium, cadmium, magnesium, etc.

In the preparation of resistance materials of the type contemplated by the present invention various procedures may be followed. For example, in the preparation of one particular combination, an intimate mixture of 60.0 g. of zinc oxide and 3.0 g. of zinc formate is first formed by dissolving the zinc formate in 45.0 g. of water and adding this to the zinc oxide to form a slurry. This slurry is then dried at approximately 110° C. until all the water has been removed. The dried cake is then pulverized and placed in a combustion tube. A vacuum is then produced in the tube and the temperature of the zinc oxide-metal mixture brought up to 700° C. and held there for five minutes. The tube is then cooled, the vacuum released, and the zinc oxide-zinc material removed. The zinc oxide-zinc material is found to be an almost white powder in which no crystal growth has taken place and in these respects it is almost identical to the original zinc oxide used. Upon measuring the resistance it was found that the material had a resistivity of approximately 100,000 ohm-cm. This value was determined from a pressed disc 0.003 cm. in thickness. Ordinary or unmodified zinc oxide when measured in a similar manner has a resistivity of almost infinity. The modified zinc oxide material was also found to fluoresce in the visual region of the spectrum (4800 to 5400 Angstrom units) when activated by ultra-violet light.

Instead of using a vacuum for firing, it has been found that an equally satisfactory semiconductor material may be produced by firing in the presence of an inert gas such as hydrogen, nitrogen, carbon dioxide, etc.

The presence of impurities does not seem to be a serious factor in producing a semiconductor of low specific resistance according to the invention. Thus ordinary commercial zinc oxide is just as satisfactory as a purified grade. This is also true of the zinc formate. It has also been found that the water used in making the slurry need not be of high purity. This is contrary to the conditions that must exist in the manufacture of fluorescent materials as is well known to those skilled in the art.

In the preparation of a zinc oxide-aluminum semiconductor material the following example of preparation is given. An intimate mixture of 60.0 g. of zinc oxide and 0.3 g. of aluminum formate is first formed by dissolving the aluminum formate in 45.0 g. of water and adding this to the zinc oxide to form a slurry. This slurry is dried as already outlined. The dried cake is pulverized and placed in a combustion tube. The air in the tube is replaced with hydrogen gas and the temperature of the zinc oxide mixture brought up to 800° C. and held there for five minutes. The tube is then cooled, the gas flow cutoff and the semiconductor material removed. The material was found to be very similar to the zinc oxide-zinc semiconductor described above. It had a resistivity of approximately 100,000 ohm-cm. and was found to fluoresce in the visual region of the spectrum.

While the exact reason why the modified zinc oxide has the above-noted desired results is not fully understood, it is believed that in the firing of the various mixtures the metallo-organic compounds like zinc formate and aluminum formate decompose into pure metal which becomes a part of the zinc oxide crystal lattice. In this connection it is therefore not necessary to use a metallic formate but any metallo-organic compound which will easily break down into pure metal and volatile compounds in the inert high temperature atmosphere of the furnace will function equally as well.

It has also been found that more than one metal may be incorporated in the semiconductor material. Thus, if a slurry of 60.0 g. of zinc oxide, 1.50 g. of zinc formate, 0.15 g. of aluminum formate and 45.0 g. of water is prepared and processed as indicated in either one of the above examples the finished semiconductor material will also have a resistiviity of approximately 100,000 ohm-cm. and will fluoresce in the visual region of the spectrum. A slightly different procedure may also be used for preparing the base materials before firing. Thus for a silver activated zinc oxide material a mixture of 60.0 g. of zinc oxide, 3.0 g. of silver carbonate and 50.0 g. of water may be prepared and the slurry ball milled for 48 hours. This slurry may then be dried and fired as already outlined. The ball milling is necessary in this example because the silver carbonate is insoluble in water and for best results as intimate a mixture as possible is desirable. The finished zinc oxide-silver semiconductor material will have a resistivity of approximately 50,000 ohm-cm. and will fluoresce in the visual region of the spectrum.

The resistivity of the semiconductor material is varied by changing the amount of metallo-organic salt present in the slurry which eventually means a variation in the amount of excess metal present in the finished zinc oxide semiconductor. A variation in resistivity of from 3000 ohm-cm. to the resistivity value for the original zinc oxide is possible. In the case of the zinc oxide-aluminum semiconductor material of the example given above a resistivity of 3000 ohm-cm. can be obtained by incorporating approximately 5.0 g. of aluminum formate in the slurry instead of the 0.3 given in the example.

In the finished zinc oxide-activator metal material the activator metal may be present to the extent of from 0.2% to 20% producing a material having a specific resistivity in the range between $3 \times 10^3$ to $10^6$ ohm-cm.

The length of time that the semiconductor material is kept at the high temperature in the furnace may vary considerably without doing any damage to the product. Thus, material has been kept at the high temperature for as long as six hours with no apparent detrimental effect upon it.

Referring to Fig. 1 of the drawing, there is shown a resistor composed mainly of a compacted or compressed body 10 of the zinc oxide semiconductor prepared according to the above described methods. The body 10 may be of simple cylindrical shape, or flat shape, or any other shape usually employed in resistors, and is provided with the usual connector wires 11, 12 which may be imbedded or otherwise integrally united to the resistor body.

Fig. 2 shows in cross section an electro-sensitive recording blank consisting, for example, of a paper or similar flexible backing member 17 having a coating 18 of conductive material such for example as carbon black mixed with a suitable binder. Superimposed on the coating 18 is a masking coating 19 composed of the zinc oxide semiconductor material hereinabove described. The semiconductor material may be mixed with a suitable binder, as described for example in U.S. Patent No. 2,398,779, so that it can be coated on to the surface 18 by any well known coating process, after which the solvents for the binder are removed by drying, thus leaving a whitish outer surface on the blank constituted of the semiconductor 19. Electric signal voltages to be recorded can be applied to the surface 19 by a suitably energized stylus 20 which results in removal of the coating 19 in minute elemental areas directly underneath the stylus 20 so as to expose the black or dark colored conductive coating 18. If desired, the paper 17, instead of being a non-conductor coated with the conductive coating 18, may be a conductive paper, which has been rendered conductive and dark in surface color by being impregnated with a suitable conductive material either during manufacture of the paper or after the manufacture of the paper. This dark colored conductive paper is then coated with the semiconductor zinc oxide coating 19. If desired, the backing 17 can be a plastic film which has dispersed throughout the body thereof a conductive filler such as conductive carbon. Applied to this dark colored conductive plastic is the zinc oxide semiconductor coating 19 above described.

Fig. 3 shows a rectifier of the asymmetric interface type. It may comprise, for example, a disc 13 of a suitable metal such as copper or zinc which is held in contact with another disc 14 formed of the zinc oxide semiconductor prepared as above described. The discs 13 and 14 may be held in contact with each other by any well known pressure means, and suitable connector wires 15 and 16 are provided for connecting the rectifier in circuit.

Referring to Fig. 4 there is shown a transistor comprising the metal base or plug member 21, for example of copper, to which is applied a layer 22 of a zinc oxide semiconductor material above described. Supported in contact with the material 22 is the fine pointed emitter electrode 23, and supported with its point in contact with layer 22 and closely adjacent to the point of emitter 23 is the collector electrode 24. The emitter electrode 23 can be connected through a suitable input impedance 25 to a suitable source of input signals, and the collector electrode 24 can be connected through a suitable output impedance 26 to the output circuit. The elements 23 and 24 may be phosphor-bronze wires of approximately 0.002" diameter with their tips spaced several mils apart while in contact with the surface of layer 22. The emitter electrode 23 can be biased positively, for example, by the biasing battery 27 and the collector electrode 24 can be biased negatively by the battery 28. On the other hand, if the electrode 23 is biased negatively then the collector electrode 24 can be biased positively. If desired, a source of pulsed voltage (not shown) may be connected across the electrodes 23 and 24 instead of, or supplementary to, the biasing source 27 and 28, to enable either electrode to be used as an emitter.

Referring to Fig. 5, there is shown a movable web or belt 29 which, because of its frictional engagement with suitable supports, for example rollers 30, 31, tends to accumulate a static electric charge. Heretofore considerable difficulty has been encountered in discharging such static charge from moving webs which in themselves are nonconductors. By applying to the web 29 a coating 32 of a zinc oxide semiconductor above-mentioned, it is possible to connect the web to ground to prevent the accumulation of undesired electrostatic charges.

What is claimed is:

1. A transistor comprising a semiconductor consisting essentially of normally non-conductive zinc oxide and at least one metal having a valence of not less than 2 nor more than 3 with the metal component constituting from 0.2 percent to 20 percent, the zinc oxide and metal having been heated together in a reducing atmosphere not substantially higher than 900 degrees C. to induce substantial electric conductivity into the zinc oxide, an emitter electrode, and a collector electrode, both of said electrodes being supported with their tips in closely spaced relation and in contact with the surface of said semiconductor.

2. An electrosensitive recording blank comprising an electrically conductive dark colored backing member and an electrosensitive masking coating of contrasting color with said backing, said masking coating consisting essentially of normally non-conductive zinc oxide and a metal having a valence of not less than 2 nor more than 3 with the metal constituting from 0.2 percent to 20 percent, the zinc oxide and metal having been heated together in a reducing atmosphere not substantially higher than 900 degrees C. to induce substantial electric conductivity into the zinc oxide itself.

3. The method of making conductive zinc oxide which comprises mixing normally non-conductive zinc oxide with a metallo-organic compound which breaks down into its components when fired in an inert atmosphere, firing the said mixture in said atmosphere with the firing temperature limited to approximately 900 degrees C. to avoid substantial sintering of the zinc oxide and without materially affecting the crystal structure of the zinc oxide while simultaneously inducing electric conductivity into the zinc oxide itself, the percentage of the metal in the mixture after firing being from 0.2 percent to 20 percent, and then cooling the mixture in a non-oxidizing atmosphere.

4. The method of making conductive zinc oxide which comprises mixing normally non-conductive zinc oxide with a solution of a metallo-organic compound to form a slurry, heating the slurry prior to said firing to remove the solvents and to form a dried residue for subsequent firing, subjecting the dried residue to a firing temperature in an inert atmosphere not substantially over 900 degrees C. to release the metal from said compound and to volatilize the remainder of the compound while simultaneously inducing electrical conductivity into the zinc oxide and to constitute the metal in the fired product of from 0.2 percent to 20 percent, and cooling the fired residue in a non-oxidizing atmosphere.

5. The method of modifying normally non-conductive zinc oxide to induce into it substantial electric conductivity which comprises forming a dried slurry of the normally non-conductive zinc oxide and a solution of a metallo-organic compound wherein the metal of the compound has a valence of not less than 2 nor more than 3, and then firing the dried slurry in an inert atmosphere to a temperature not substantially over 900 degrees C. to free the said metal from its compound while volatilizing the remainder of the compound and simultaneously inducing electric conductivity into the zinc oxide but without any substantial change in its crystal structure, the metal constituting approximately 0.2 percent to 20 percent, the dried slurry being cooled in a non-oxidizing atmosphere.

References Cited in the file of this patent

UNITED STATES PATENTS

| | | |
|---|---|---|
| 1,640,335 | Grondahl | Aug. 23, 1927 |
| 1,784,435 | Grondahl | Dec. 9, 1930 |
| 1,994,632 | Becker | Mar. 19, 1935 |
| 2,182,377 | Guanella | Dec. 5, 1939 |
| 2,408,475 | Nickle | Oct. 1, 1946 |
| 2,529,711 | Smith | Nov. 14, 1950 |
| 2,544,236 | Reimert et al. | Mar. 6, 1951 |
| 2,699,522 | Breckenridge | Jan. 11, 1955 |

OTHER REFERENCES

Physica, vol. 17, No. 8, August 1951, pages 761–776.